(12) United States Patent
Yang et al.

(10) Patent No.: US 10,025,143 B2
(45) Date of Patent: Jul. 17, 2018

(54) ARRAY SUBSTRATE AND FABRICATION METHOD THEREOF, AND DISPLAY DEVICE

(71) Applicants: BOE TECHNOLOGY GROUP CO., LTD., Beijing (CN); CHENGDU BOE OPTOELECTRONICS TECHNOLOGY CO., LTD., Chengdu, Sichuan (CN)

(72) Inventors: Xiaofei Yang, Beijing (CN); Yuqing Yang, Beijing (CN); Yanxia Xin, Beijing (CN); Zailong Mo, Beijing (CN); Xue Jiang, Beijing (CN); Xun Mou, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu, Sichuan (CN)

( * ) Notice: Subject to any disclaimer, the term of this patent is extended or adjusted under 35 U.S.C. 154(b) by 71 days.

(21) Appl. No.: 15/110,230

(22) PCT Filed: Nov. 13, 2015

(86) PCT No.: PCT/CN2015/094583
§ 371 (c)(1),
(2) Date: Jul. 7, 2016

(87) PCT Pub. No.: WO2016/201874
PCT Pub. Date: Dec. 22, 2016

(65) Prior Publication Data
US 2017/0146844 A1    May 25, 2017

(30) Foreign Application Priority Data

Jun. 19, 2015 (CN) .......................... 2015 1 0346651

(51) Int. Cl.
*G02F 1/1339* (2006.01)
*G02F 1/1343* (2006.01)
(Continued)

(52) U.S. Cl.
CPC ........ *G02F 1/13394* (2013.01); *G02F 1/1368* (2013.01); *G02F 1/13624* (2013.01);
(Continued)

(58) Field of Classification Search
CPC ............... G02F 1/1339; G02F 1/13394; G02F 2001/13396; G02F 1/136227;
(Continued)

(56) References Cited

U.S. PATENT DOCUMENTS

2002/0012083 A1\* 1/2002 Tanaka .............. G02F 1/133514
349/106
2004/0223109 A1\* 11/2004 Taniguchi ........... G02F 1/13394
349/156
(Continued)

FOREIGN PATENT DOCUMENTS

CN    101587265 A    11/2009
CN    102073171 A    5/2011
(Continued)

OTHER PUBLICATIONS

International Search Report and Written Opinion dated Mar. 17, 2016; PCT/CN2015/094583.
(Continued)

*Primary Examiner* — Jia Pan
(74) *Attorney, Agent, or Firm* — Ladas & Parry LLP

(57) ABSTRACT

An array substrate and a fabrication method thereof and a display device are provided. The array substrate comprises: a base substrate; a plurality of gate lines and a plurality of data lines formed on the base substrate, the plurality of gate lines and the plurality of data lines intersecting with each
(Continued)

other to define a plurality of sub-pixels, each of the sub-pixels including a thin film transistor and a pixel electrode, and the plurality of sub-pixels including a first sub-pixel; a passivation layer formed on the base substrate and covering the gate lines, the data lines and the thin film transistor, a via hole being provided in the passivation layer and the pixel electrode being formed on the passivation layer and connected with a drain electrode or a source electrode of the thin film transistor through the via hole in each of the sub-pixels; and a first spacer, provided in the via hole of the first sub-pixel.

16 Claims, 9 Drawing Sheets

(51) Int. Cl.
G02F 1/1362 (2006.01)
G02F 1/1333 (2006.01)
G02F 1/1368 (2006.01)

(52) U.S. Cl.
CPC .. G02F 1/133345 (2013.01); G02F 1/134309 (2013.01); G02F 1/136227 (2013.01); G02F 1/136286 (2013.01); G02F 2001/13398 (2013.01); G02F 2001/134345 (2013.01); G02F 2001/136218 (2013.01); G02F 2201/121 (2013.01); G02F 2201/123 (2013.01)

(58) Field of Classification Search
CPC ... G02F 1/134309; G02F 2001/134318; G02F 1/134363; G02F 2001/134372; G02F 2001/136218
See application file for complete search history.

(56) References Cited

U.S. PATENT DOCUMENTS

| | | | | |
|---|---|---|---|---|
| 2010/0007837 A1* | 1/2010 | Ham | .................. | G02F 1/134309 349/139 |
| 2011/0102698 A1* | 5/2011 | Wang | .................. | G02F 1/13338 349/54 |
| 2011/0122357 A1* | 5/2011 | Chang | ............... | G02F 1/133512 349/155 |
| 2011/0156039 A1* | 6/2011 | Baek | .................. | G02F 1/13394 257/59 |
| 2013/0222723 A1* | 8/2013 | Kim | ........................ | H01L 33/58 349/40 |
| 2013/0234143 A1* | 9/2013 | Hwang | .................. | G02F 1/1362 257/57 |
| 2015/0002774 A1* | 1/2015 | Choi | ..................... | G02F 1/1368 349/43 |
| 2015/0002775 A1* | 1/2015 | Chang | ............... | G02F 1/133512 349/43 |

FOREIGN PATENT DOCUMENTS

| | | | |
|---|---|---|---|
| CN | 102346340 A | | 2/2012 |
| CN | 102955297 A | | 3/2013 |
| CN | 104375331 A | | 2/2015 |
| CN | 104656320 A | | 5/2015 |
| CN | 104880878 A | | 9/2015 |
| KR | 1020080034545 A | | 4/2008 |
| KR | 20140098964 A | * | 8/2014 |

OTHER PUBLICATIONS

The First Chinese Office Action dated May 26, 2017; Appln. No. 201510346651.0.

* cited by examiner

ARRAY SUBSTRATE AND FABRICATION METHOD THEREOF, AND DISPLAY DEVICE

TECHNICAL FIELD

Embodiments of the present disclosure relate to an array substrate, a fabrication method of the array substrate, and a display device comprising the array substrate.

BACKGROUND

At present, a liquid crystal display device plays a dominant role in a flat-plate display device market. The liquid crystal display device mainly includes an array substrate and an opposed substrate which are provided opposite to each other, and a liquid crystal layer sandwiched between the array substrate and the opposed substrate. In order to control a uniform gap between the array substrate and the opposed substrate and maintain uniformity of thickness of the liquid crystal layer, a spacer is further provided between the array substrate and the opposed substrate.

FIG. 1 is a plane schematic view illustrating an array substrate according to one technique; FIG. 2 is a cross-sectional schematic view illustrating the liquid crystal display device, and the cross-sectional schematic view is cut along a line of A-A' in FIG. 1. As shown in FIG. 1 and FIG. 2, the array substrate includes a base substrate 01, and a buffer layer 02, an active layer 03, a gate insulation layer 04, a gate line layer (including a gate line 05 and a gate electrode G), an inter-layer insulation layer 06, a data line layer (including a data line 07, a source electrode S and a drain electrode D), a passivation layer 08 and a via hole 09 provided in the passivation layer 08, a pixel electrode 010, an inter-electrode insulation layer 011 and a common electrode 012, which are sequentially provided on the base substrate 01. The gate lines 05 and the data lines 07 intersect with each other to define a plurality of sub-pixels, and each sub-pixel includes a thin film transistor and the pixel electrode. In each sub-pixel, the thin film transistor is formed by the active layer 03, the gate electrode G, the source electrode S and the drain electrode D, and the pixel electrode 010 is connected with the drain electrode D of the thin film transistor through the via hole 09. The opposed substrate includes another base substrate 016, and a black matrix 013, a passivation layer 014 and a spacer 015 which are sequentially provided on the base substrate 016.

With further reference to FIG. 1 and FIG. 2, the spacer 015 is provided on the opposed substrate, and a top end thereof abuts on a flat region between adjacent sub-pixels of the array substrate. As a resolution of the liquid crystal display device increases, a size of the sub-pixel becomes smaller and smaller; in this case, since there is the via hole 09, an area of the flat region between adjacent sub-pixels of the array substrate is reduced; if the liquid crystal display device suffers an external force, the spacer 05 may easily slide into the via hole 09 and scratch an alignment layer (not shown) provided on a surface of the array substrate in the process of sliding. In the case that the spacer 05 slides into the via hole 09, it is hard to realize a uniform gap between the array substrate and the opposed substrate or maintain uniformity of the thickness of the liquid crystal layer, resulting in uneven displayed image, and decreasing display quality; and in the case that the alignment layer is scratched, abnormal alignment of the liquid crystal molecules in the liquid crystal layer is caused, resulting in light leakage.

SUMMARY

According to embodiments of the disclosure, an array substrate is provided. The array substrate comprises: a base substrate; a plurality of gate lines and a plurality of data lines formed on the base substrate, the plurality of gate lines and the plurality of data lines intersecting with each other to define a plurality of sub-pixels, each of the sub-pixels including a thin film transistor and a pixel electrode, and the plurality of sub-pixels including a first sub-pixel; a passivation layer formed on the base substrate and covering the gate lines, the data lines and the thin film transistors, a via hole being provided in the passivation layer and the pixel electrode being formed on the passivation layer and connected with a drain electrode or a source electrode of the thin film transistor through the via hole in each of the sub-pixels; and a first spacer, provided in the via hole of the first sub-pixel.

For example, the plurality of sub-pixels further include a second sub-pixel; and the array substrate further comprises a second spacer provided in the via hole of the second sub-pixel.

For example, a height of the first spacer is greater than a height of the second spacer on the base substrate.

For example, each of the sub-pixels further includes a common electrode and an inter-electrode insulation layer provided between the common electrode and the pixel electrode; the inter-electrode insulation layer has a portion provided on the first spacer but does not have a portion provided on the second spacer, and/or the common electrode has a portion provided on the first spacer but does not have a portion provided on the second spacer.

For example, a height of the first spacer is equal to a height of the second spacer on the base substrate; each of the sub-pixels further includes a common electrode and an inter-electrode insulation layer provided between the common electrode and the pixel electrode; the inter-electrode insulation layer has a portion provided on the first spacer but does not have a portion provided on the second spacer, and/or the common electrode has a portion provided on the first spacer but does not have a portion provided on the second spacer.

For example, the array substrate further comprises a third spacer provided above at least one of the gate lines and/or at least one of the data lines.

For example, the array substrate further comprises a shielding electrode provided on the third spacer.

For example, each of the sub-pixels further includes a common electrode and an inter-electrode insulation layer provided between the common electrode and the pixel electrode; and the shielding electrode is provided in a same layer with the common electrode.

For example, a height of the first spacer, a height of the second spacer and a height of the third spacer are equal to each other on the base substrate; each of the sub-pixels further includes a common electrode and an inter-electrode insulation layer provided between the common electrode and the pixel electrode; the inter-electrode insulation layer has a portion provided on the first spacer and the common electrode has a portion provided on the first spacer; the third spacer is provided with a shielding electrode provided in a same layer with the common electrode.

According to the embodiments of the disclosure, a display device is provided. The display device comprises: an array substrate; an opposed substrate, provided opposite to the array substrate; and a liquid crystal layer, provided between the array substrate and the opposed substrate. The array substrate comprises: a base substrate; a plurality of gate lines and a plurality of data lines formed on the base substrate, the plurality of gate lines and the plurality of data lines intersecting with each other to define a plurality of sub-pixels, each of the sub-pixels including a thin film transistor and a pixel electrode, and the plurality of sub-pixels including a first sub-pixel; a passivation layer formed on the base substrate and covering the gate lines, the data lines and the thin film transistors, a via hole being provided in the passivation layer and the pixel electrode being formed on the passivation layer and connected with a drain electrode or a source electrode of the thin film transistor through the via hole in each of the sub-pixels; and a first spacer, provided in the via hole of the first sub-pixel. An end of the first spacer abuts on the opposed substrate.

For example, the plurality of sub-pixels further include a second sub-pixel, and the array substrate further comprises a second spacer provided in the via hole of the second sub-pixel.

For example, a height of the first spacer is greater than a height of the second spacer on the base substrate.

For example, each of the sub-pixels further includes a common electrode and an inter-electrode insulation layer provided between the common electrode and the pixel electrode; and the inter-electrode insulation layer has a portion provided on the first spacer but does not have a portion provided on the second spacer, and/or the common electrode has a portion provided on the first spacer but does not have a portion provided on the second spacer.

For example, a height of the first spacer is equal to a height of the second spacer on the base substrate; each of the sub-pixels further includes a common electrode and an inter-electrode insulation layer provided between the common electrode and the pixel electrode; the inter-electrode insulation layer has a portion provided on the first spacer but does not have a portion provided on the second spacer, and/or the common electrode has a portion provided on the first spacer but does not have a portion provided on the second spacer.

For example, the display device further comprises a third spacer provided above at least one of the gate lines and/or at least one of the data lines.

For example, the display device further comprises a shielding electrode provided on the third spacer.

For example, each of the sub-pixels further includes a common electrode and an inter-electrode insulation layer provided between the common electrode and the pixel electrode; and the shielding electrode is provided in a same layer with the common electrode.

For example, a height of the first spacer, a height of the second spacer and a height of the third spacer are equal to each other on the base substrate; each of the sub-pixels further includes a common electrode and an inter-electrode insulation layer provided between the common electrode and the pixel electrode; the inter-electrode insulation layer has a portion provided on the first spacer and the common electrode has a portion provided on the first spacer; and the third spacer is provided with a shielding electrode provided in a same layer with the common electrode.

For example, the opposed substrate includes a color filter layer, and the color filter layer has a portion provided above the first spacer.

According to the embodiments of the disclosure, a fabrication method of an array substrate is provided. The method comprises: forming a plurality of gate lines and a plurality of data lines on a base substrate, the plurality of gate lines and the plurality of data lines intersecting with each other to define a plurality of sub-pixels, each of the sub-pixels including a thin film transistor and a pixel electrode, and the plurality of sub-pixels including a first sub-pixel; forming a passivation layer covering the gate lines, the data lines and the thin film transistors on the base substrate, a via hole being provided in the passivation layer and the pixel electrode being formed on the passivation layer and connected with a drain electrode or a source electrode of the thin film transistor through the via hole in each of the sub-pixels; and forming a first spacer in the via hole of the first sub-pixel.

BRIEF DESCRIPTION OF THE DRAWINGS

In order to clearly illustrate the technical solution of the embodiments of the present disclosure, the drawings of the embodiments will be briefly described in the following; it is obvious that the described drawings are only related to some embodiments of the present disclosure and thus are not limitative of the present disclosure.

FIG. 14a and FIG. 14b to FIG. 16a and FIG. 16b illustrate a flow schematic view I of a fabrication method of an array substrate according to the embodiments of the present disclosure;

FIG. 17a and FIG. 17b to FIG. 18a and FIG. 18b illustrate a flow schematic view II of the fabrication method of the array substrate according to the embodiments of the present disclosure; and FIG. 19a and FIG. 19b to FIG. 20a and FIG. 20b illustrate a flow schematic view III of the fabrication method of the array substrate according to the embodiments of the present disclosure.

DETAILED DESCRIPTION

In order to make objects, technical details and advantages of the embodiments of the present disclosure apparent, the technical solutions of the embodiment will be described in a clearly and fully understandable way in connection with the drawings related to the embodiments of the present disclosure. It is obvious that the described embodiments are just a part but not all of the embodiments of the present disclosure. Based on the described embodiments herein, those skilled in the art can obtain other embodiment(s), without any inventive work, which should be within the scope of the present disclosure.

Unless otherwise specified, the technical terms or scientific terms here should be of general meanings as understood by those ordinarily skilled in the art. In the specification and claims of the present disclosure of the patent application, words such as "first", "second" and the like do not denote any order, quantity, or importance, but rather are used for distinguishing different components. Similarly, words such as "one", "a/an" or "the" or the like do not denote quantitative limitation, but rather indicate there is at least one. Wordings of "include" or "comprise" and the like denote that elements or objects appearing before the word of "include" or "comprise" cover the elements or the objects enumerated after the word of "include" or "comprise" or equivalents thereof, not exclusive of other elements or objects. Words such as "up", "down", "left", "right" and the like are only used for expressing relative positional relationship, in the case that the absolute position of a described object is changed, the relative positional relationship may also be correspondingly changed.

Figure 1:
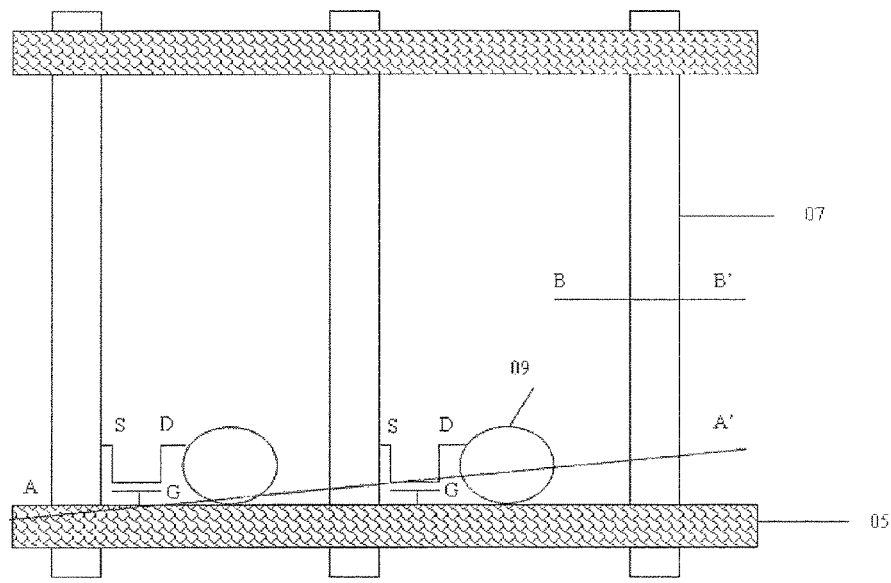
FIG. 1 is a plane schematic view illustrating an array substrate according to one technique.
Figures 2A, 2B:
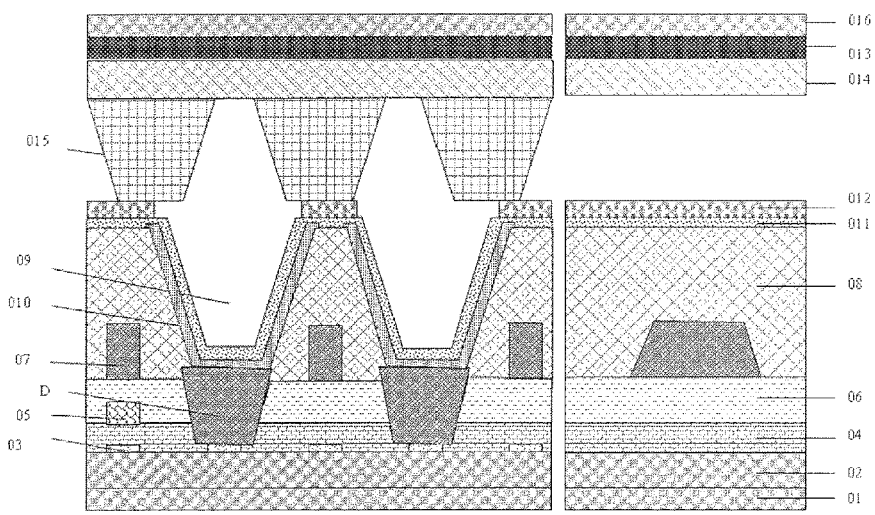
FIG. 2a and FIG. 2b are cross-sectional schematic views illustrating a liquid crystal display device of FIG. 1, which are cut along a line of A-A' in FIG. 1.
Figure 3:
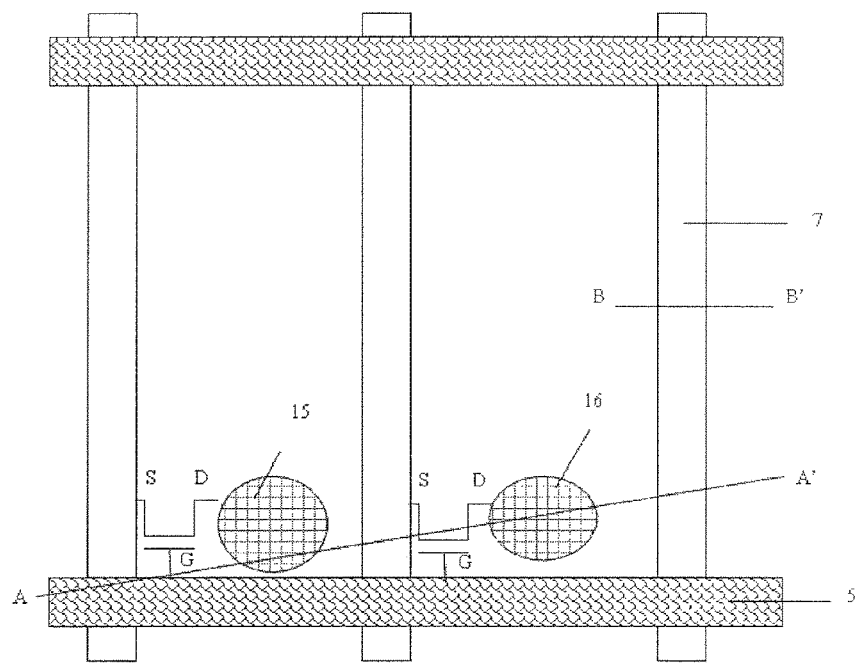
FIG. 3 is a plane schematic view I illustrating an array substrate according to embodiments of the present disclosure.
Figures 4A, 4B:
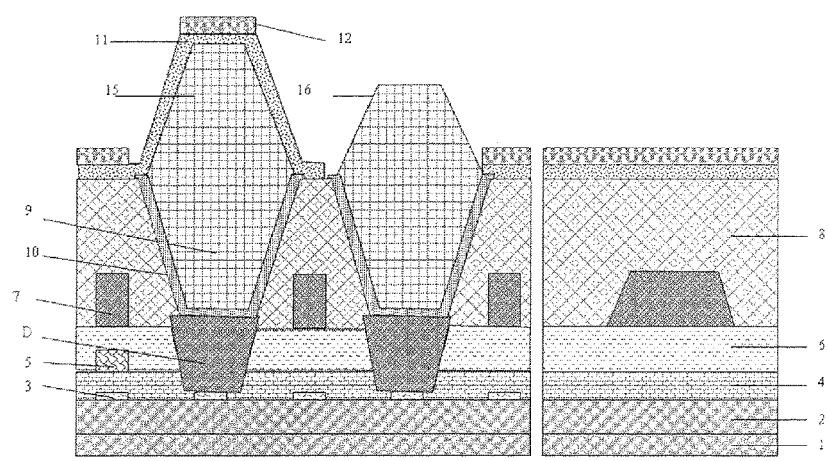
FIG. 4a and FIG. 4b are cross-sectional schematic views illustrating the array substrate according to the embodiments of the present disclosure, which are cut along a line of A-A' in FIG. 3, wherein a height of a first spacer is greater than a height of a second spacer on a base substrate.

According to embodiments of the disclosure, there is provided an array substrate. FIG. 3 is a plane schematic view illustrating the array substrate according to the embodiments of the present disclosure; FIG. 4a and FIG. 4b are cross-sectional schematic views cut along a line of A-A' in FIG. 3. In conjunction with FIG. 3 and FIG. 4a as well as FIG. 4b, the array substrate according to the embodiments of the present disclosure comprises: a base substrate 1; a plurality of gate lines 5 and a plurality of data lines 7 formed on the base substrate 1, the plurality of gate lines 5 and the plurality of data lines 7 intersecting with each other to define a plurality of sub-pixels, each sub-pixel including a thin film transistor and a pixel electrode 10, and the plurality of sub-pixels including a first sub-pixel; a passivation layer 8 formed on the base substrate 1 and covering the gate lines 5, the data lines 7 and the thin film transistors, a via hole 9 being provided in the passivation layer and the pixel electrode 10 being formed on the passivation layer 8 and connected with a drain electrode D or a source electrode S of the thin film transistor through the via hole 9 in each sub-pixel; and a first spacer 15, provided in the via hole of the first sub-pixel.

After the array substrate according to the embodiments of the present disclosure and an opposed substrate are bonded to form a display device, an end of the first spacer abuts on the opposed substrate, so that the first spacer is configured for maintaining a uniform gap between the array substrate and the opposed substrate and maintaining uniformity of a thickness of a liquid crystal layer sandwiched between the array substrate and the opposed substrate.

In the array substrate according to the embodiments of the present disclosure, the first spacer is provided in the via hole of the first sub-pixel. Therefore, even if the display device suffers an external force, the first spacer does not easily slide, and thus situations of nonuniform thickness of the liquid crystal layer and scratches of an alignment layer (not shown in the drawings, the alignment layer is provided on a surface of the array substrate facing the opposed substrate) caused by the first spacer sliding into the via hole are avoided. And thus, the uniform gap between the array substrate and the opposed substrate and the uniformity of the thickness of the liquid crystal layer are maintained well, and light leakage caused by scratches of the alignment layer is avoided, and the display quality is improved.

For example, the thin film transistor includes an active layer 03, a gate electrode G, a source electrode S and a drain electrode D; the gate electrode G is connected with the gate line 5 or integrally formed with the gate line 5, the source electrode S or the drain electrode D is connected with the data line 7 or integrally formed with the data line 7, and the drain electrode D or the source electrode S is connected with the pixel electrode 10.

For example, as shown in FIGS. 4a and 4b, in the array substrate according to the embodiments of the present disclosure, a buffer layer 2 is formed on the base substrate 1 at first, so as to prevent impurities in the base substrate 1 from entering the active layer 3 and improve the quality of the active layer 3; and the active layer 3, a gate insulation layer 4, a gate line layer (including the gate line 5 and the gate electrode G), an inter-layer insulation layer 6, and a data line layer (including the data line 7, the source electrode S and the drain electrode D) are sequentially formed on the buffer layer 2. However, the embodiments of the present disclosure are not limited thereto, the array substrate according to the embodiments of the present disclosure may not adopt the buffer layer, and these layers such as the active layer 3, the gate insulation layer 4, the gate line layer (including the gate line 5 and the gate electrode G), the inter-layer insulation layer 6, and the data line layer (including the data line 7, the source electrode S and the drain electrode D) may be provided in any known stacking sequence. Accordingly, in the array substrate according to the embodiments of the present disclosure, the thin film transistor is of a bottom gate type, a top gate type or any known type.

For example, with further reference to FIG. 3 and FIG. 4a as well as FIG. 4b, the plurality of sub-pixels further include a second sub-pixel, and the second sub-pixel is different from the first sub-pixel described above; the array substrate according to the embodiments of the present disclosure further comprises a second spacer 16, and the second spacer 16 is provided in the via hole 9 of the second sub-pixel.

For example, as shown in FIGS. 4a and 4b, a height of the first spacer 15 is greater than a height of the second spacer 16 on the base substrate 1; in this case, the first spacer 15 is regarded as a main spacer, and the second spacer 16 is regarded as an assistant spacer. Generally, the liquid crystal layer contracts at a low temperature so that a volume thereof is reduced. If too many spacers are provided, the opposed substrate is not deformed, and at the low temperature, bubbles are generated in the liquid crystal layer if the display device is suddenly impacted by an external force, resulting in a defect of low temperature bubble. If a number of the spacers is reduced, the defect of low temperature bubble is avoided to a certain degree but a supporting role of the spacer to the opposed substrate is weakened, the opposed substrate is deformed greatly and not easily recovered in the case that the opposed substrate is under action of a great external force, resulting in a defect of pressing. In the array substrate according to the embodiments of the present disclosure, the first spacer 15 and the second spacer 16 are provided, and the height of the first spacer 15 is greater than the height of the second spacer 16, so that not only the defect of low temperature bubble is avoided, but also the defect of pressing is avoided.

In addition, since the second spacer 16 is provided in the via hole 9 of the second sub-pixel, the second spacer 16 is prevented from sliding to scratch the alignment layer, and thus abnormal alignment of liquid crystal molecules in the liquid crystal layer and light leakage caused by scratches of the alignment layer are avoided.

In the case that the height of the first spacer 15 is greater than the height of the second spacer 16, for example, the first spacer 15 and the second spacer 16 are formed by two different patterning processes with using two different single-tone masks. In addition, in order to reduce a number of the masks and simplify the fabrication process, the first spacer 15 and the second spacer 16 for example are formed by a single patterning process with using one dual-tone mask.

For example, with further reference to FIG. 4a and FIG. 4b, each sub-pixel further includes a common electrode 12 and an inter-electrode insulation layer 11 provided between the common electrode 12 and the pixel electrode 10. For example, the inter-electrode insulation layer 11 has a portion provided on the first spacer 15 but does not have a portion provided on the second spacer 15; and/or, the common electrode 12 has a portion provided on the first spacer 15 but does not have a portion provided on the second spacer 16. As described above, the first spacer 15 and the second spacer 16 for example are formed by the single patterning process with using one dual-tone mask; in order to effectively avoid the defect of low temperature bubble and the defect of pressing, it is necessary to form an enough height difference between the first spacer 15 and the second spacer 16, which increases technical difficulty in the patterning process of using the dual-tone mask. In the array substrate according to the embodiments of the present disclosure, since the inter-electrode insulation layer 11 has the portion provided on the first spacer 15 but does not have the portion provided on the second spacer 16 and/or the common electrode 12 has the portion provided on the first spacer 15 but does not have the portion provided on the second spacer 16, technical requirements on the patterning process of using the dual-tone mask is reduced and flexibility in designs of the first spacer 15 and the second spacer 16 is increased while the defect of low temperature bubble and the defect of pressing are avoided effectively. In this case, the first spacer 15 and the portion of the inter-electrode insulation layer 11 and/or the portion of the common electrode 12 provided on the spacer 15 are regarded as the main spacer.

It should be noted that, the portion of the inter-electrode insulation layer 11 provided on the first spacer 15 may be disconnected from or connected with other portions of the inter-electrode insulation layer 11, and the portion of the common electrode 12 provided on the first spacer 15 may be disconnected from or connected with other portions of the common electrode 12.

It is shown in FIG. 4a that both the portion of the inter-electrode insulation layer 11 and the portion of the common electrode 12 are formed on the first spacer 15; for example, in the case that the height of the first spacer 15 is greater than the height of the second spacer 16, neither the portion of the inter-electrode insulation layer 11 or the portion of the common electrode 12 is formed on the first spacer 15, or only one of the portion of the inter-electrode insulation layer 11 and the portion of the common electrode 12 is formed on the first spacer 15.

Figures 5A, 5B:
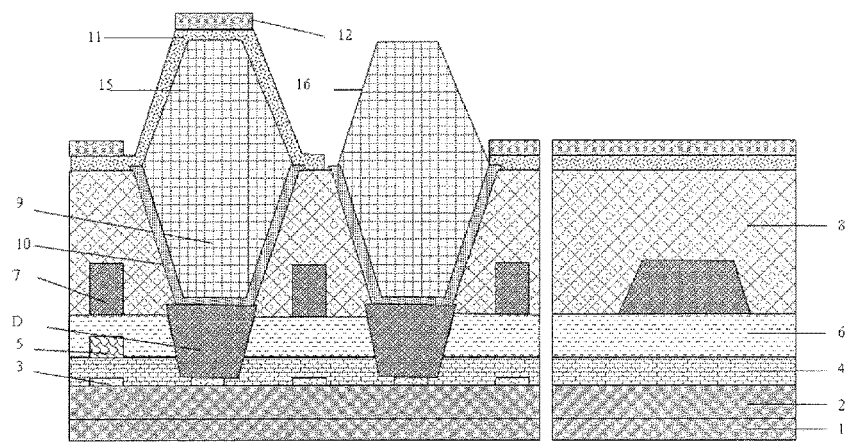
FIG. 5a and FIG. 5b are cross-sectional schematic views illustrating the array substrate according to the embodiments of the present disclosure, which are cut along the line of A-A' in FIG. 3, wherein the height of the first spacer is equal to the height of the second spacer on the base substrate.

FIG. 5a and FIG. 5b are cross-sectional schematic views illustrating the array substrate according to the embodiments of the present disclosure, which are cut along the line of A-A' in FIG. 3. As shown in FIG. 5a and FIG. 5b, the height of the first spacer 15 is equal to the height of the second spacer 16 on the base substrate 1. Since the height of the first spacer 15 is equal to the height of the second spacer 16, the first spacer 15 and the second spacer 16 are formed by a single patterning process with using one single-tone mask, which reduces the technical difficulty and technical cost. Further, for example, as shown in FIG. 5a and FIG. 5b, the inter-electrode insulation layer 11 has the portion provided on the first spacer 15 but does not have the portion provided on the second spacer 16, and/or the common electrode 12 has the portion provided on the first spacer 15 but does not have the portion provided on the second spacer 16, in this way, the defect of low temperature bubble and the defect of pressing are avoided as well. In this case, the first spacer 15 and the portion of the inter-electrode insulation layer 11 and/or the portion of the common electrode 12 provided on the first spacer 15 are regarded as the main spacer.

It should be noted that, the portion of the inter-electrode insulation layer 11 provided on the first spacer 15 is disconnected from or connected with other portions of the inter-electrode insulation layer 11, and the portion of the common electrode 12 provided on the first spacer 15 is disconnected from or connected with other portions of the common electrode 12.

It is shown in FIG. 5a that both the portion of the inter-electrode insulation layer 11 and the portion of the common electrode 12 are formed on the first spacer 15; for example, in a case that the height of the first spacer 15 is equal to the height of the second spacer 16, only one of the portion of the inter-electrode insulation layer 11 and the portion of the common electrode 12 is formed on the first spacer 15.

For example, in the array substrate according to the embodiments of the present disclosure, neither the first spacer 15 nor the second spacer 16 is provided in the via hole(s) of one or some sub-pixels.

In the array substrate according to the embodiments of the present disclosure, a ratio of a number of the first spacer 15 to a number of the second spacer 16, for example, is 1:10 to 1:100, and further, for example, is 1:18 or 1:36.

Figure 6:
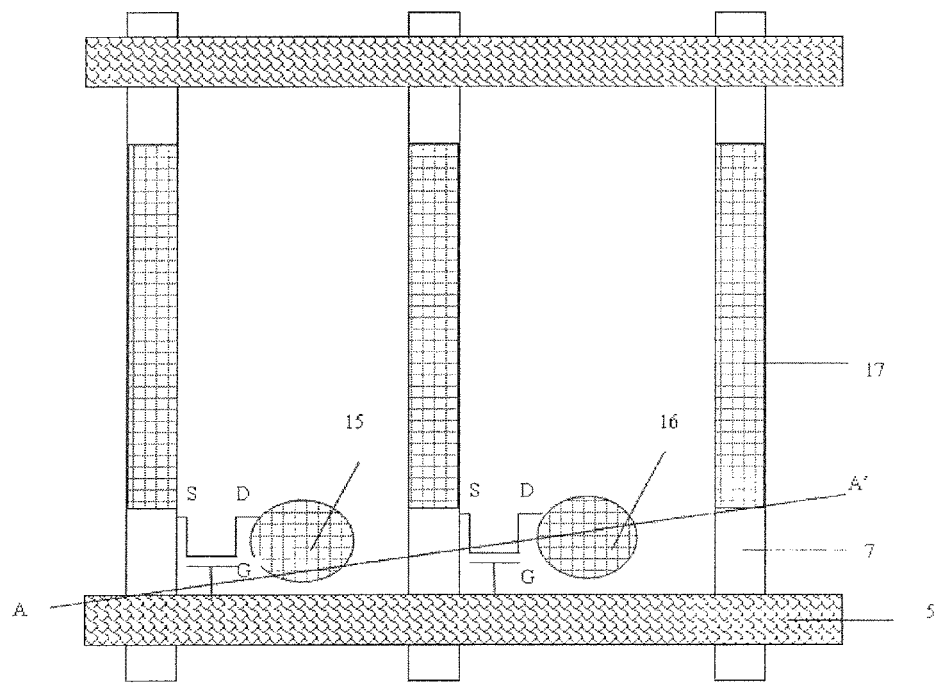
FIG. 6 is a plane schematic view II illustrating another array substrate according to the embodiments of the present disclosure.
Figures 7A, 7B:
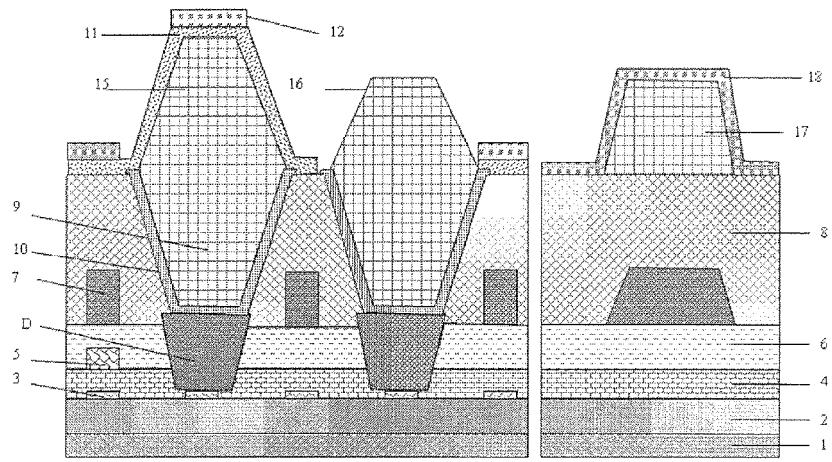
FIG. 7a and FIG. 7b are cross-sectional schematic views illustrating the array substrate according to the embodiments of the present disclosure, which are cut along a line of A-A' in FIG. 6, wherein a third spacer is formed.

FIG. 6 is a plane schematic view II of the array substrate according to the embodiments of the present disclosure, and FIG. 7a and FIG. 7b are cross-sectional schematic views cut along a line of A-A' in FIG. 6. Referring to FIG. 6 and FIG. 7a as well as FIG. 7b, the array substrate according to the embodiments of the present disclosure further comprises a third spacer 17 provided above at least one of the data line 7 and/or at least one of the gate line 5. Since the third spacer 17 has a certain height, it blocks electric line between adjacent sub-pixels, and thus electric field interference between adjacent sub-pixels is reduced.

For example, the array substrate according to the embodiments of the present disclosure comprises a display region for arranging the plurality of sub-pixels and a peripheral region surrounding the display region. For example, a length of the third spacer 17 is less than or equal to a length of the display region along an extending direction of the third spacer 17, that is, the third spacer 17 is provided inside the display region.

For example, with further reference to FIG. 6 and FIG. 7a as well as FIG. 7b, the array substrate according to the embodiments of the present disclosure further comprises a shielding electrode 18 provided on the third spacer 17, so as to further reduce electric field interference between adjacent sub-pixels. For example, no voltage is applied to the shielding electrode 18. For example, a voltage is applied to the shielding electrode 18; for example, a low level voltage (such as a 0-level voltage) is applied to the shielding electrode 18. For example, the shielding electrode 18 is provided in a same layer with the common electrode 12, so that the shielding electrode 18 and the common electrode 12 are formed by a single patterning process at the same time, to simplify the fabrication process. For example, the shielding electrode 18 is connected with the common electrode 12, so that a common voltage is applied to the shielding electrode 18. For example, the shielding electrode 18 is disconnected from the common electrode 12, so that the shielding electrode 18 and the common electrode 12 are driven separately. For example, a portion of the inter-electrode insulation layer 11 is further provided between the shielding electrode 18 and the third spacer 17. For example, the portion of the inter-electrode insulation layer 11 provided between the shielding electrode 18 and the third spacer 17 is disconnected from or connected with other portions of the inter-electrode insulation layer 11. For example, the shielding electrode 18 covers an upper surface and a side surface of the third spacer 17.

Figures 8A, 8B:
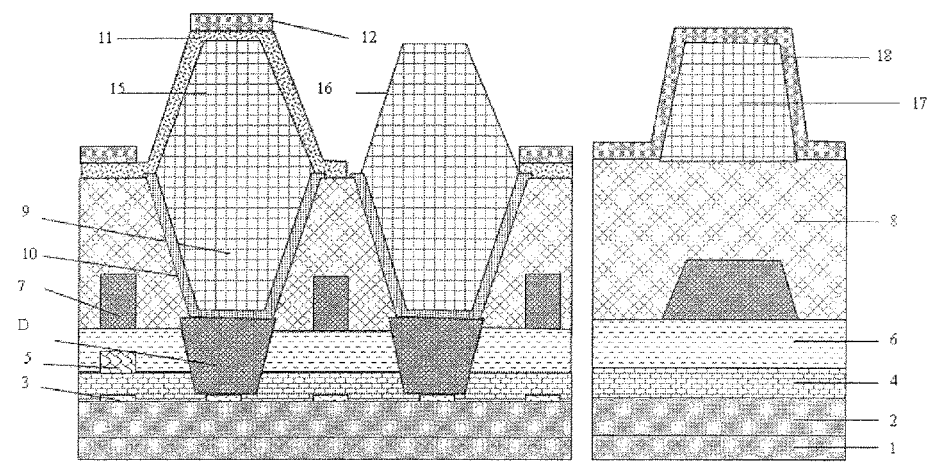
FIG. 8a and FIG. 8b are cross-sectional schematic views illustrating the array substrate according to the embodiments of the present disclosure, which are cut along the line of A-A' in FIG. 6, wherein a height of the first spacer, a height of the second spacer and a height of the third spacer are same on the base substrate.

For example, in order to simplify the fabrication process, the first spacer 15, the second spacer 16 and the third spacer 17 are fabricated to have a same height, as shown in FIGS. 8a and 8b; in this case, the first spacer 15, the second spacer 16 and the third spacer 17 are formed by a single patterning process with using one single-tone mask. Further, for example, the inter-electrode insulation layer 11 has the portion provided on the first spacer 15 and the common electrode 12 has the portion provided on the first spacer 15, and the shielding electrode 18 provided in the same layer with the common electrode 12 is formed on the third spacer 17; and therefore, the first spacer 15 and the portion of the inter-electrode insulation layer 11 and the portion of the common electrode 12 provided on the first spacer 15 are regarded as the main spacer, the third spacer 17 and the shielding electrode 18 provided on the third spacer 17 are regarded as a first assistant spacer, the second spacer 16 is regarded as a second assistant spacer, and a height of the main spacer, a height of the first assistant spacer and a height of the second assistant spacer are sequentially reduced, so that the defect of low temperature bubble and the defect of pressing are more effectively avoided.

It should be noted that, in the array substrate according to the embodiments of the present disclosure, the base substrate 1, the buffer layer 2, the active layer 3, the gate insulation layer 4, the gate line layer (including the gate line 5 and the gate electrode G), the inter-layer insulation layer 6, the data line layer (including the data line 7, the source electrode S and the drain electrode D), the passivation layer 8, the pixel electrode 10, the inter-electrode insulation layer 11 and the common electrode 12 may be made of any known material or formed by any known method, which will not be repeated here. For example, the active layer 3 is made of a low temperature polysilicon. For example, the passivation layer 8 is made of an organic resin, for example, an acrylic resin. For example, the spacer (such as the first spacer 15, the second spacer 16 and the third spacer 17) is made of an organic resin, for example, a negative PR adhesive. For example, the first spacer 15, the second spacer 16 and the third spacer 17 are made of a same material or different materials.

It should be noted that, it is shown in FIG. 3 to FIG. 8b that the first spacer 15 and the second spacer 16 formed in the via hole 9 are in direct contact with the pixel electrode 10 formed in the via hole 9; however, the embodiments of the present disclosure are not limited thereto, an inserting layer may be formed between the first spacer 15 and the pixel electrode 10 and/or between the second spacer 16 and the pixel electrode 10 according to actual needs.

According to the embodiments of the present disclosure, there is further provided a display device. The display device comprises: the array substrate described above; an opposed substrate, provided opposite to the array substrate, wherein an end of the first spacer abuts on the opposed substrate; and a liquid crystal layer, provided between the array substrate and the opposed substrate. Since the display device according to the embodiments of the present disclosure comprises the array substrate described above, even if the display device is under action of an external force, the first spacer is not easily slide, and thus situations of nonuniform thickness of the liquid crystal layer and scratches of the alignment layer (not shown, which is provided on a surface of the array substrate facing the opposed substrate) caused by the first spacer sliding into the via hole are avoided. And thus, the uniform gap between the array substrate and the opposed substrate is realized, the uniformity in the thickness of the liquid crystal layer is maintained well, the light leakage caused by scratches of the alignment layer is avoided, and the display quality is improved.

FIGS. 9a and 9b, FIGS. 10a and 10b, FIGS. 11a and 11b, FIGS. 12a and 12b, and FIGS. 13a and 13b are cross-sectional schematic views illustrating the display device according to the embodiments of the present disclosure. As shown in FIG. 9a to FIG. 13b, the opposed substrate includes a base substrate 20, and a black matrix 13 and a passivation layer 14 which are sequentially provided on the base substrate 20; the first spacer 15, the second spacer 16 and the third spacer 17 as described above are all provided in a region covered by the black matrix 13.

Figures 9A, 9B:
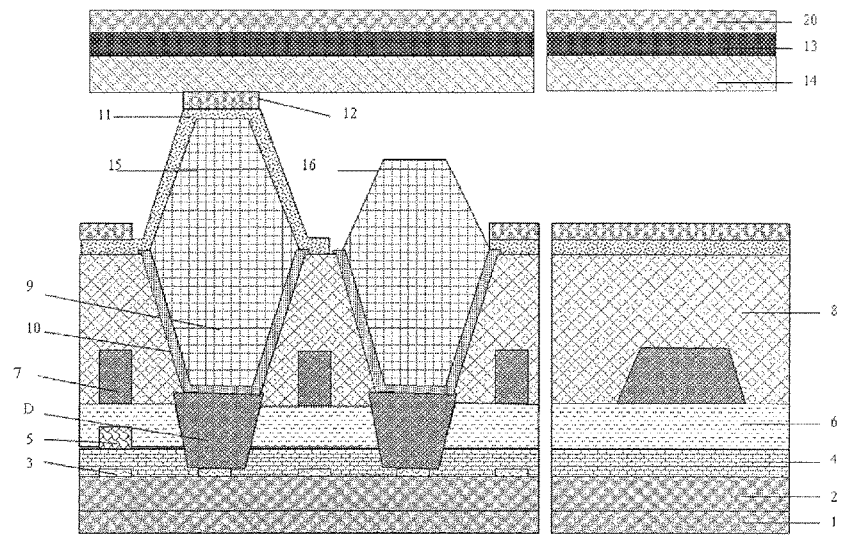
FIG. 9a and FIG. 9b illustrate a cross-sectional schematic view I of a display device according to the embodiments of the present disclosure.
Figures 10A, 10B:
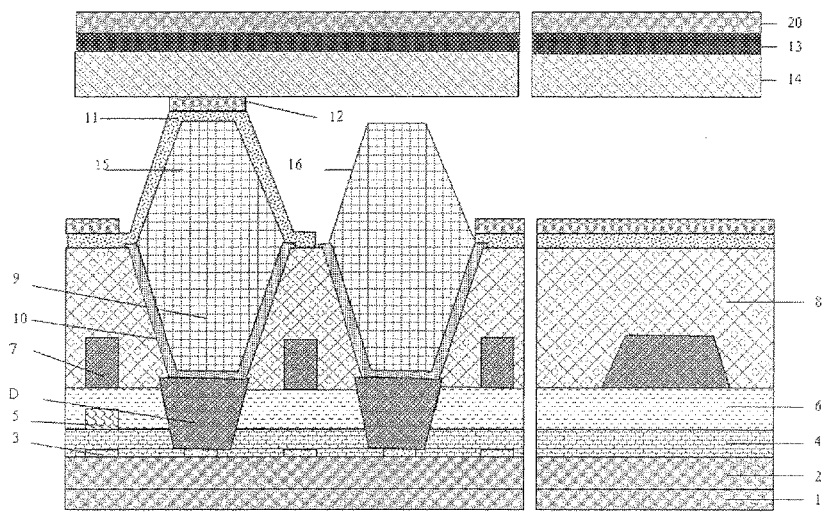
FIG. 10a and FIG. 10b illustrate a cross-sectional schematic view II of the display device according to the embodiments of the present disclosure.
Figures 11A, 11B:
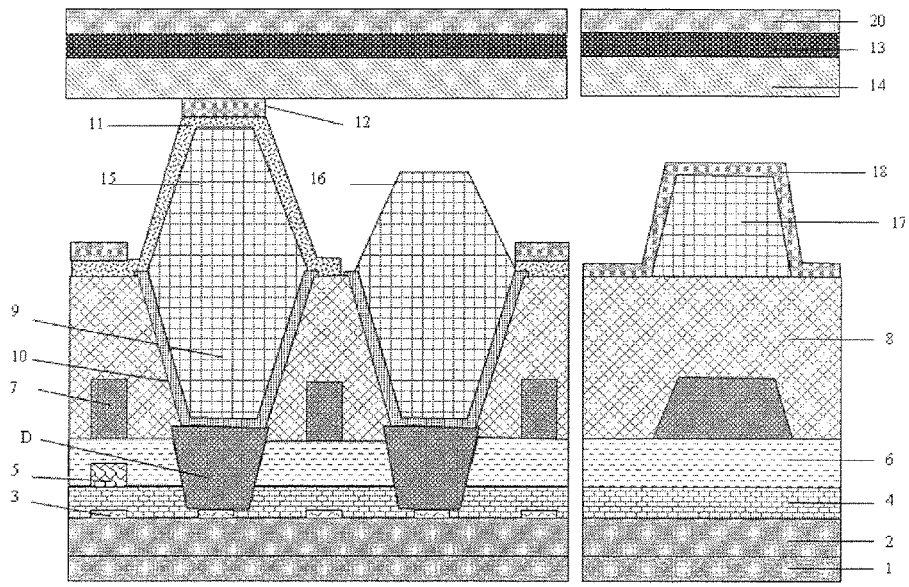
FIG. 11a and FIG. 11b illustrate a cross-sectional schematic view III of the display device according to the embodiments of the present disclosure.
Figures 12A, 12B:
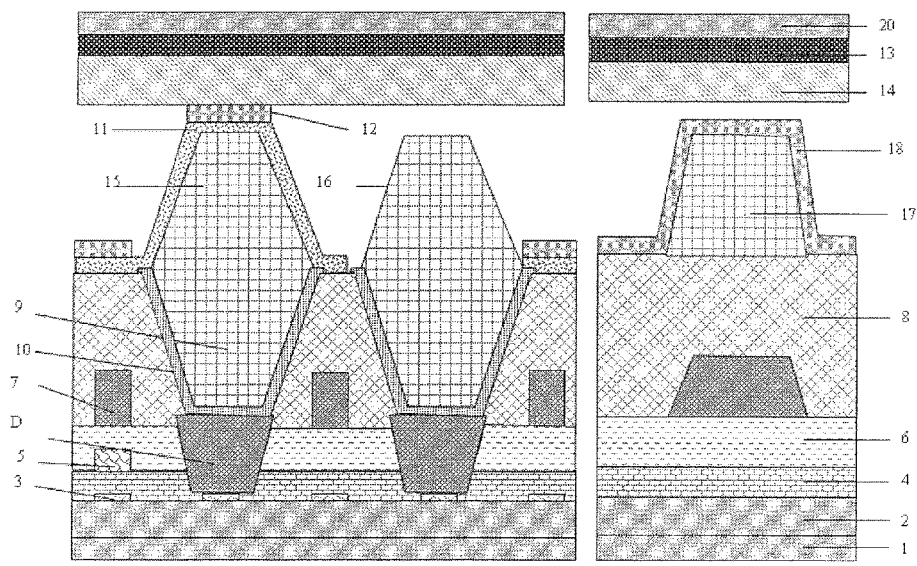
FIG. 12a and FIG. 12b illustrate a cross-sectional schematic view IV of the display device according to the embodiments of the present disclosure.

The display device shown in FIGS. 9a and 9b adopts the array substrate shown in FIGS. 4a and 4b, the display device shown in FIGS. 10a and 10b adopts the array substrate shown in FIGS. 5a and 5b, the display device shown in FIGS. 11a and 11b adopts the array substrate shown in FIGS. 7a and 7b, and the display device shown in FIGS. 12a and 12b adopts the array substrate shown in FIGS. 8a and 8b, which will not be repeated here.

Figures 13A, 13B:
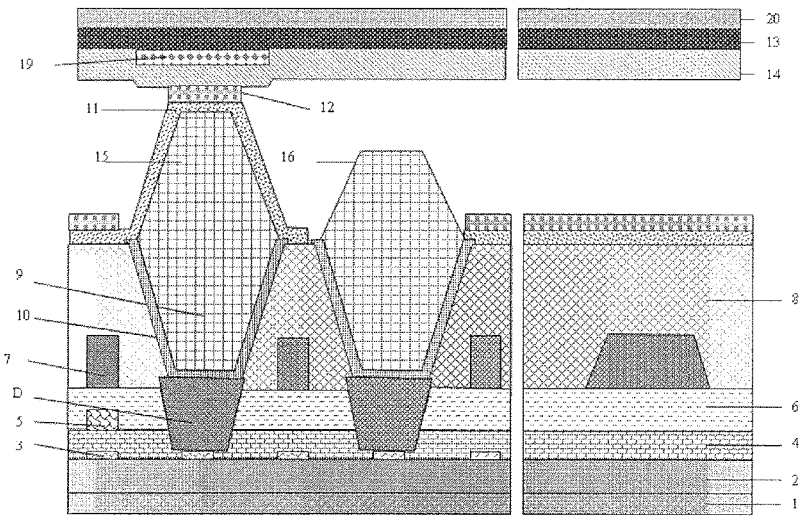
FIG. 13a and FIG. 13b illustrate a cross-sectional schematic view V of the display device according to the embodiments of the present disclosure.

Except for the opposed substrate, the display device shown in FIGS. 13a and 13b is almost same as the display device shown in FIGS. 9a and 9b. In the display device shown in FIGS. 13a and 13b, the opposed substrate further includes a color filter layer 19. For example, the color filter layer 19 has a portion provided above the first spacer 15 but does not have a portion provided above the second spacer 16, which is also conducive to avoiding the defect of low temperature bubble and the defect of pressing and further reduce technical requirements on a patterning process of using the dual-tone mask and increase flexibility in designs of the first spacer 15 and the second spacer 16. It should be noted that, the opposed substrate shown in FIGS. 13a and 13b may replace the opposed substrate shown in FIGS. 10a and 10b, FIGS. 11a and 11b, and FIGS. 12a and 12b.

For example, the display device according to the embodiments of the present disclosure is any product or component having a display function, such as a liquid crystal display panel, a liquid crystal display device, a mobile phone, a tablet PC, a TV, a monitor, a laptop computer, a digital photo frame, a navigator, etc.

According to the embodiments of the disclosure, there is further provided a fabrication method of an array substrate. The fabrication method of the array substrate comprises: forming a plurality of gate lines 5 and a plurality of data lines 7 on a base substrate 1, the plurality of gate lines 5 and the plurality of data lines 7 intersecting with each other to define a plurality of sub-pixels, each sub-pixel including a thin film transistor and a pixel electrode 10, and the plurality of sub-pixels including a first sub-pixel; forming a passivation layer 8 covering the gate lines 5, the data lines 7 and the thin film transistors on the base substrate 1, a via hole being provided in the passivation layer 8 and the pixel electrode 10 being formed on the passivation layer 8 and connected with a drain electrode D or a source electrode S of the thin film transistor through the via hole 9 in the each sub-pixel; and forming a first spacer 15 in the via hole of the first sub-pixel 9.

In the fabrication method of the array substrate according to the embodiments of the disclosure, the first spacer is formed in the via hole of the first sub-pixel. And thus, even if a display device formed by bonding the array substrate and an opposed substrate is under action of external forces, the first spacer is not easily slide, so that situations of nonuniform thickness of the liquid crystal layer and scratches of an alignment layer (not shown, which is provided on a surface of the array substrate facing the opposed substrate) caused by the first spacer sliding into the via hole are avoided. And thus, a uniform gap between the array substrate and the opposed substrate and uniformity of a thickness of the liquid crystal layer are maintained well, and a light leakage caused by scratches of the alignment layer is avoided, and a display quality is improved.

For example, the plurality of sub-pixels further include a second sub-pixel, and the fabrication method of the array substrate further comprises: forming a second spacer 16 in the via hole 9 of the second sub-pixel.

Figures 14A, 14B:
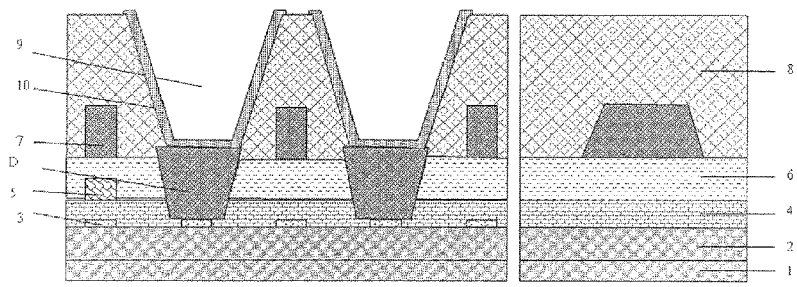

FIGS. 14a and 14b to FIGS. 16a and 16b show a flow schematic view I of the fabrication method of the array substrate according to the embodiments of the present disclosure. Firstly, as shown in FIGS. 14a and 14b, a buffer layer 2 is formed on a base substrate 1, and an active layer 3, a gate insulation layer 4, a gate line layer (including the gate line 5 and a gate electrode G), an inter-layer insulation layer 6, a data line layer (including the data line 7, the source electrode S and the drain electrode D), the passivation layer 8 and the via hole 9, and the pixel electrode 10 are sequentially formed on the buffer layer. The thin film transistor is formed by the active layer 3, the gate electrode G, the source electrode S and the drain electrode D, and the pixel electrode 10 is connected with the drain electrode D or the source electrode S of the thin film transistor through the via hole 9 provided in the passivation layer 8. The respective layers described above may be made of any known materials or formed by any known methods, which will not be repeated here. The sequence for stacking the respective layers described above is not limited to the sequence shown in FIGS. 14a and 14b, and may be adjusted according to actual needs, which will not be repeated here.

Figures 15A, 15B:
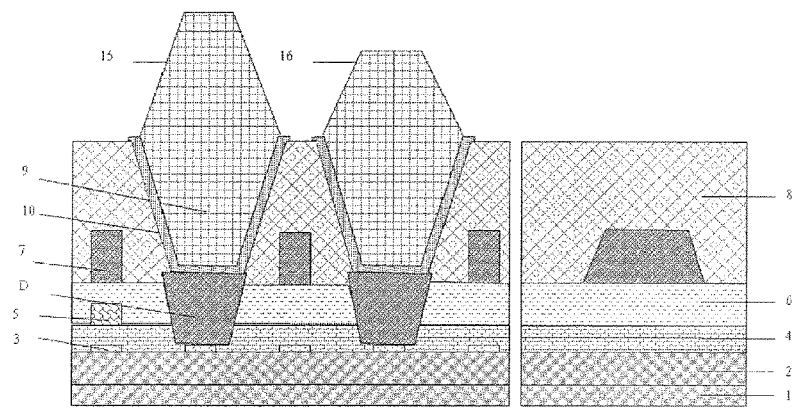
Figures 16A, 16B:
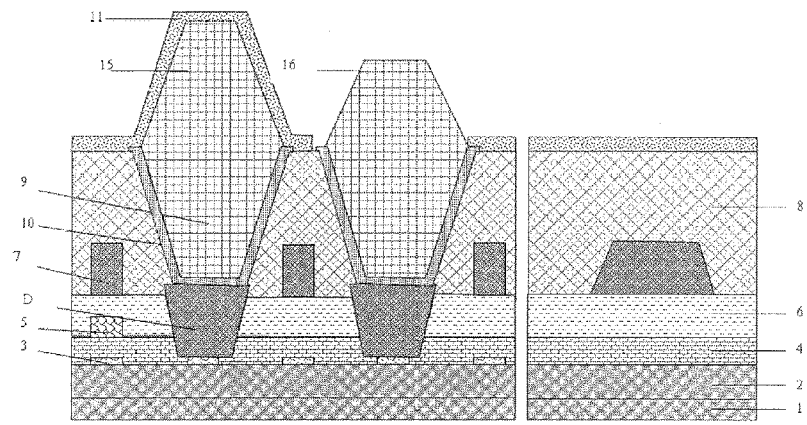

And then, a material layer for forming the spacer (for example, such material layer for forming the spacer is formed by a photoresist adhesive and has a thickness of 4 to 6 μm) is formed, and the material layer for forming the spacer is patterned by using a dual-tone mask (such as, a half-tone mask and a gray-tone mask), to form the first spacer 15 and the second spacer 16 by a single patterning process at the same time, and a height of the first spacer 15 is greater than a height of the second spacer 16, as shown in FIGS. 15a and 15b. For example, the fabrication method of the array substrate further comprises: forming an inter-electrode insulation layer 11 on the pixel electrode 10, and the inter-electrode insulation layer 11 has a portion provided on the first spacer 15 but does not have a portion provided on the second spacer 16, as shown in FIGS. 16a and 16b. For example, the fabrication method of the array substrate further comprises: forming a common electrode 12 on the inter-electrode insulation layer 11, and the common electrode 12 has a portion provided on the first spacer 15 but does not have a portion provided on the second spacer 16, and thus the array substrate shown in FIGS. 4a and 4b is obtained.

Figures 17A, 17B:
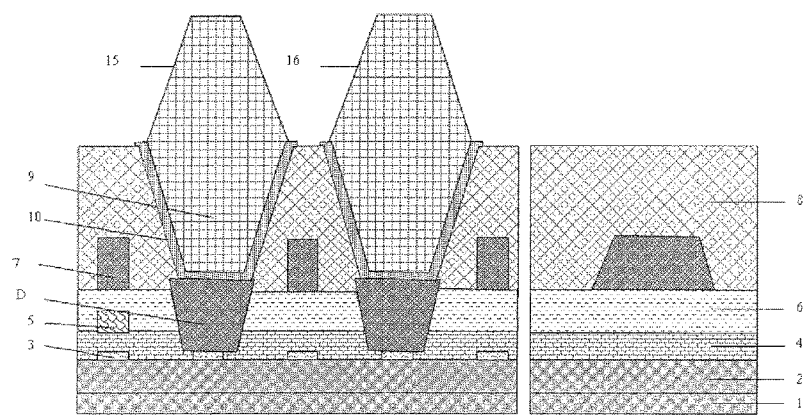
Figures 18A, 18B:
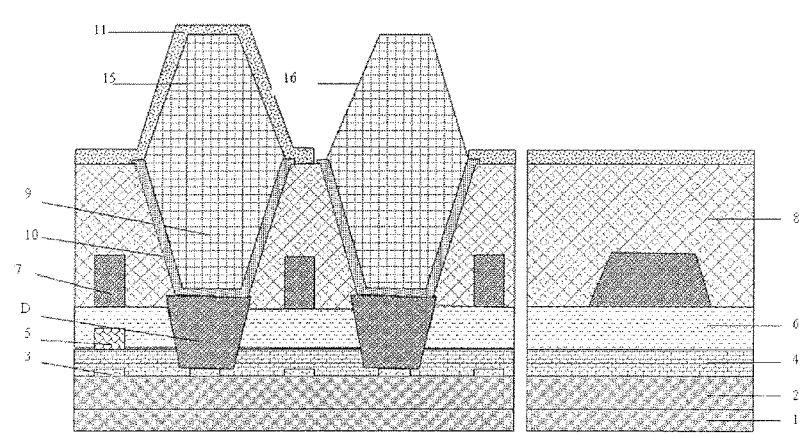

FIGS. 17a and 17b to FIGS. 18a and 18b show a flow schematic view II of the fabrication method of the array substrate according to the embodiments of the present disclosure. After forming the structure shown in FIGS. 14a and 14b, the material layer for forming the spacer (for example, the material layer for forming the spacer is formed by the photoresist adhesive and has a thickness of 4 to 6 μm) is formed, and the material layer for forming the spacer is patterned by using a single-tone mask, to form the first spacer 15 and the second spacer 16 by a single patterning process at the same time, and the height of the first spacer 15 is equal to the height of the second spacer 16, as shown in FIGS. 17a and 17b. For example, the fabrication method of the array substrate further comprises: forming the inter-electrode insulation layer 11 on the pixel electrode 10, and the inter-electrode insulation layer 11 has the portion provided on the first spacer 15 but does not have the portion provided on the second spacer 16, as shown in FIGS. 18a and 18b. For example, the fabrication method of the array substrate further comprises: forming the common electrode 12 on the inter-electrode insulation layer 11, and the common electrode 12 has the portion provided on the first spacer 15 but does not have the portion provided on the second spacer 16, and thus the array substrate shown in FIGS. 5a and 5b is obtained.

Figures 19A, 19B:
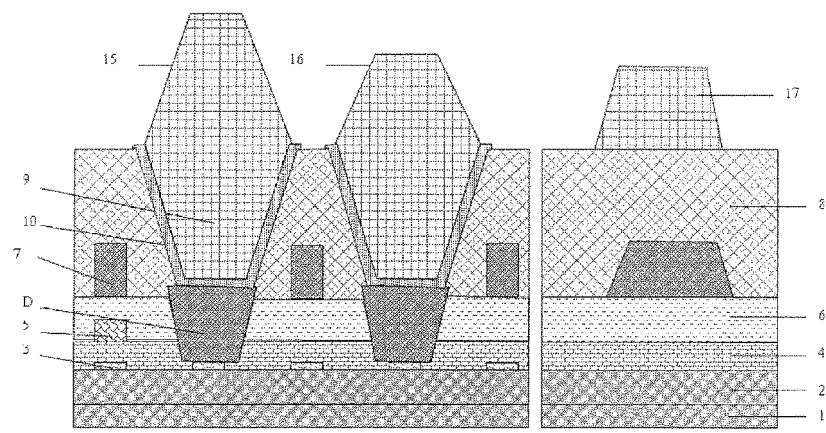
Figures 20A, 20B:
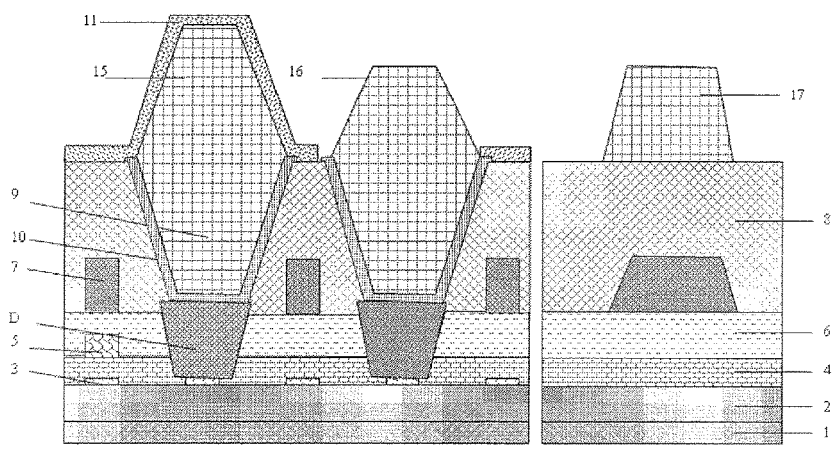

FIG. 19a and FIG. 19b to FIG. 20a and FIG. 20b show a flow schematic view III of the fabrication method of the array substrate according to the embodiments of the present disclosure. After the structure shown in FIGS. 14a and 14b is formed, the first spacer 15, the second spacer 16 and a third spacer 17 are formed, as shown in FIGS. 19a and 19b. For example, the first spacer 15, the second spacer 16 and the third spacer 17 are formed by three different patterning processes by using three different masks. For example, the first spacer 15 and the second spacer 16 are formed by a single patterning process with using one dual-tone mask, and then the third spacer 17 is formed by a single patterning process with using one single-tone mask. In order to simplify the fabrication process, for example, the first spacer 15, the second spacer 16 and the third spacer 17 are fabricated to have a same height; in this way, the first spacer 15, the second spacer 16 and the third spacer 17 are formed by a single patterning process with using one single-tone mask. For example, the fabrication method of the array substrate further comprises: forming the inter-electrode insulation layer 11 on the pixel electrode 10, and the inter-electrode insulation layer 11 has the portion provided on the first spacer 15 but does not have the portion provided on the second spacer 16, as shown in FIGS. 20a and 20b. For example, the fabrication method of the array substrate further comprises: forming the common electrode 12 on the inter-electrode insulation layer 11, and the common electrode 12 has the portion provided on the first spacer 15 but does not have the portion provided on the second spacer 16. Further, the fabrication method of the array substrate further comprises: forming a shielding electrode 18 on the third spacer 17, and thus the array substrate shown in FIGS. 7a and 7b is obtained. For example, the common electrode 12 and the shielding electrode 18 are formed by patterning a common electrode material layer at the same time.

The foregoing embodiments merely are exemplary embodiments of the present disclosure, and not intended to define the scope of the present disclosure, and the scope of the disclosure is determined by the appended claims.

The invention claimed is:

1. An array substrate, comprising:
   a base substrate;
   a plurality of gate ones and a plurality of data lines formed on the base substrate, the plurality of gate lines and the plurality of data lines intersecting with each other to define a plurality of sub-pixels, each of the sub-pixels including a thin film transistor and a pixel electrode, and the plurality of sub-pixels including a first sub-pixel;
   a passivation layer formed on the base substrate and covering the gate lines, the data ones and the thin film transistors, a via hole being provided in the passivation layer and the pixel electrode being formed on the passivation layer and connected with a drain electrode or a source electrode of the thin film transistor through the via hole in each of the sub-pixels; and
   a first spacer, provided in the via hole of the first sub-pixel, wherein,
   the plurality of sub-pixels further include a second sub-pixel;
   the array substrate further comprises a second spacer provided in the via hole of the second sub-pixel;
   each of the sub-pixels further includes a common electrode and an inter-electrode insulation layer provided between the common electrode and the pixel electrode; and
   at least one of the inter-electrode insulation layer and the common electrode has a portion provided on the first spacer but does not have a portion provided on the second spacer.

2. The array substrate according to claim 1, wherein, a height of the first spacer is greater than a height of the second spacer on the base substrate.

3. The array substrate according to claim 1, wherein, a height of the first spacer is equal to a height of the second spacer on the base substrate.

4. The array substrate according to claim 1, further comprising a third spacer provided above at least one line among the plurality of gate lines and the plurality of data lines.

5. The array substrate according to claim 4, further comprising a shielding electrode provided on the third spacer.

6. The array substrate according to claim 5, wherein the shielding electrode is provided in a same layer with the common electrode.

7. The array substrate according to claim 4, wherein, a height of the first spacer, a height of the second spacer and a height of the third spacer are equal to each other on the base substrate;
   the inter-electrode insulation layer has a portion provided on a topmost end of the first spacer and the common electrode has a portion provided on the topmost end of the first spacer; and
   the third spacer is provided with a shielding electrode provided in a same layer with the common electrode.

8. A display device, comprising
   an array substrate, wherein the array substrate comprises:
      a base substrate;
      a plurality of gate lines and a plurality of data lines formed on the base substrate, the plurality of gate lines and the plurality of data lines intersecting with each other to define a plurality of sub-pixels, each of the sub-pixels including a thin film transistor and a pixel electrode, and the plurality of sub-pixels including a first sub-pixel;
      a passivation layer formed on the base substrate and covering the gate lines, the data lines and the thin film transistors, a via hole being provided in the passivation layer and the pixel electrode being formed on the passivation layer and connected with a drain electrode or a source electrode of the thin film transistor through the via hole in each of the sub-pixels; and
      a first spacer, provided in the via hole of the first sub-pixel;
   an opposed substrate, provided opposite to the array substrate, wherein an end of the first spacer abuts on the opposed substrate; and
   a liquid crystal layer, provided between the array substrate and the opposed substrate, wherein,
   the plurality of sub-pixels further include a second sub-pixel;
   the array substrate further comprises a second spacer provided in the via hole of the second sub-pixel;
   each of the sub-pixels further includes a common electrode and an inter-electrode insulation layer provided between the common electrode and the pixel electrode; and
   at least one of the inter-electrode insulation layer and the common electrode has a portion provided on the first spacer but does not have a portion provided on the second spacer.

9. The display device according to claim 8, wherein, a height of the first spacer is greater than a height of the second spacer on the base substrate.

10. The display device according to claim 8, wherein, a height of the first spacer is equal to a height of the second spacer on the base substrate.

11. The display device according to claim 8, further comprising a third spacer provided above at least one line among the plurality, of gate lines and the plurality of data lines.

12. The display device according to claim 11, further comprising a shielding electrode provided on the third spacer.

13. The display device according to claim 12, wherein, the shielding electrode is provided in a same layer with the common electrode.

14. The display device according to claim 11, wherein, a height of the first spacer, a height of the second spacer and a height of the third spacer are equal to each other on the base substrate;
   the inter-electrode insulation layer has a portion provided on a topmost end of the first spacer and the common electrode has a portion provided on the topmost end of the first spacer; and the third spacer is provided with a shielding electrode provided in a same layer with the common electrode.

15. The display device according to claim 8, wherein the opposed substrate includes a color filter layer, and the color filter layer has a portion provided above the first spacer so that a surface of the opposed substrate facing the array substrate has a protrusion portion corresponding to the color filter layer and protruding toward the array substrate.

16. A fabrication method of an array substrate, comprising:
   forming a plurality of gate lines and a plurality of data lines on a base substrate, the plurality of gate lines and the plurality of data lines intersecting with each other to define a plurality of sub-pixels, each of the sub-pixels including a thin film transistor and a pixel electrode, and the plurality of sub-pixels including a first sub-pixel;
   forming a passivation layer covering the gate lines, the data lines and the thin film transistors on the base substrate, a via hole being provided in the passivation layer and the pixel electrode being formed on the passivation layer and connected with a drain electrode or a source electrode of the thin film transistor through the via hole in each of the sub-pixels; and
   forming a first spacer in the via hole of the first sub-pixel, wherein,
   the plurality of sub-pixel further includes a second sub-pixel;
   the method further comprises: forming a second spacer in the via hole of the second sub-pixel;
   the method further comprises: forming a common electrode and an inter-electrode insulation layer provided between the common electrode and the pixel electrode in each of the sub-pixels; and
   at least one of the inter-electrode insulation layer and the common electrode has a portion provided on the first spacer but does not have a portion provided on the second spacer.

\* \* \* \* \*